No. 645,127. Patented Mar. 13, 1900.
L. C. REED.
SYSTEM OF ELECTRIC METERING.
(Application filed July 10, 1899.)
(No Model.)
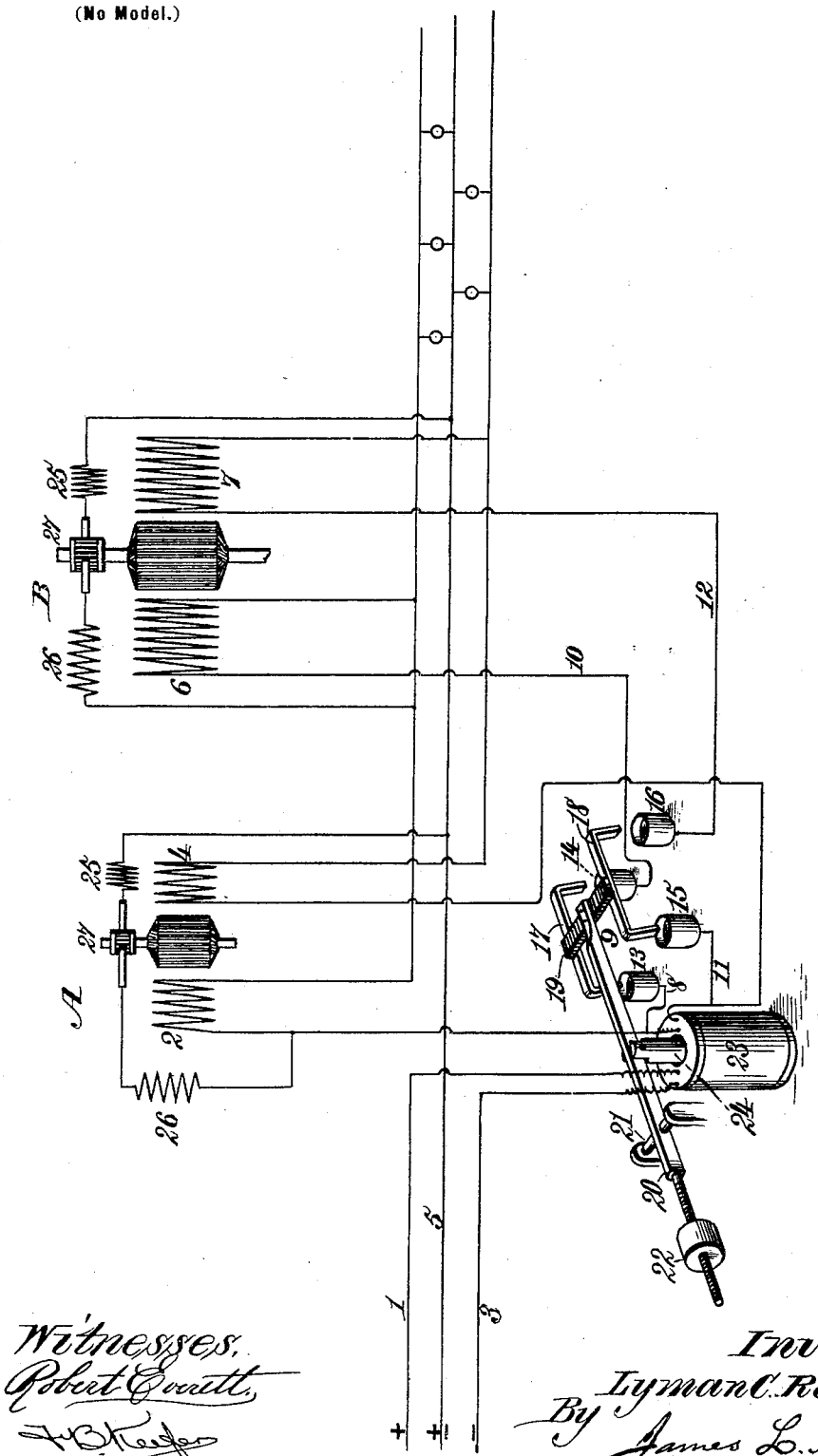
Witnesses,
Robert Everett,
F. B. Keefer.
Inventor.
Lyman C. Reed,
By James L. Norris,
Atty.

UNITED STATES PATENT OFFICE.

LYMAN C. REED, OF NEW ORLEANS, LOUISIANA.

SYSTEM OF ELECTRIC METERING.

SPECIFICATION forming part of Letters Patent No. 645,127, dated March 13, 1900.

Application filed July 10, 1899. Serial No. 723,381. (No model.)

*To all whom it may concern:*

Be it known that I, LYMAN C. REED, a citizen of the United States, residing at New Orleans, in the parish of Orleans and State of Louisiana, have invented new and useful Improvements in Systems of Electric Metering, of which the following is a specification.

As is well known, electric meters of all sizes have a load curve which on small loads—generally estimated at about fifteen per cent. of the rated capacity of the meter—shows an incorrect register of the current flowing through it. On all meters, therefore, it is impossible to measure with accuracy the current consumed when the current is used in quantities bearing but a small proportion to the total capacity of the meter installed.

My present invention is designed to overcome the objection to the present system of metering by providing means whereby a true record of the current consumed in large installations may be obtained through all ranges of load.

In carrying out the invention I employ a plurality of meters of different capacities and provide means for automatically coupling the meters in multiple when the load is greater than the capacity of the small meter.

The details of the invention will be set forth hereinafter, and the novelty thereof will be defined in the claims.

In the accompanying drawing my invention is illustrated in connection with a three-wire system of distribution, the view thereof representing the switch mechanism in perspective and the meters and circuits diagrammatically.

The meter A is one of small capacity and the meter B of relatively-large capacity. Two meters only are shown in the drawing, although it is obvious that three or more may be used, if desired. The circumstances under which more than two will be necessary, however, are extremely rare, and my invention can be clearly brought out by the present illustration. The positive service-wire 1 passes through the positive field-coil 2 of the meter A and thence to the lights or other translating devices to be supplied. The negative service-wire 3 passes through the negative field-coil 4 of the meter A, and the neutral wire 5 is free throughout its entire length.

The positive and negative fields 6 and 7 of the meter B are in a normally-open branch circuit from the service-wires 1 and 3 through the wire 8, switch 9, and wire 10, and through the wire 11, switch 9, and wire 12. The switch 9 is made up of two pairs of mercury-cups 13 14 and 15 16, the wire 8, connected with the cup 13; the wire 10 to the cup 14, the wire 11 to the cup 15, and the wire 12 to the cup 16. Projecting into these cups and adapted to close the circuit between the same are contact-strips 17 and 18, the same being connected by an insulating cross-bar 19, which is itself attached to one end of a lever 20, fulcrumed at 21 to a stationary part of the device and having mounted upon its opposite end an adjustable counterbalance-weight 22. At a point between the fulcrum 21 and the cross-bar 19 is a solenoid 23, having a core 24 therein, which is attached to the lever 20. The said solenoid is made up of coils of the service-wires 1 and 3, wound in opposite directions, so that the magnetic action of the current through both wires will be exerted in the same direction. The adjustable weight 22 normally depresses the end of the lever 20, to which it is connected, thereby elevating the opposite end of said lever carrying the contact-strips 17 and 18 and holding said strips normally out of the mercury-cups in which they fit. The said switch, therefore, is ordinarily open.

The meter A is and the meter B may be supplied with the usual starting-coil 25 in a normally-closed circuit from one of the outer legs of the service-circuit to the neutral leg 5, the said circuit including the resistance 26 and commutator 27 with its attendant brushes.

Constructed as above described the operation of my device is as follows: With a small load the current consumed passes through the small meter A, the larger meter being cut out by the switch 9. This small load will be accurately measured and recorded by the meter A. When a number of lights is operated, however, beyond the capacity of the small meter A, the solenoid 23 will be energized sufficiently to overcome action of counterbalance-weight 22 and the core 24 thereof will be drawn down, carrying with it the lever 20 and the contact-strips 17 and 18, closing the circuit through the large meter B by way of the wire 8, cup 13, contact-strip 17, cup 14, wire 10, and positive field 6 to service, and through wire 11, cup 15, contact-strip 18, cup 16, wire 12, and negative field 7 to negative service-wire. It will thus be seen that large loads or those which the installation would justify the constant use of will be registered by both meters, whereas small loads or those which the large meter cannot effectually handle will be measured and recorded by the small meter A. The action of coupling the meters is entirely automatic, and by means of my improved arrangement accuracy of measurement may be had at all times.

While I do not limit myself to the exact relative sizes of the meters A and B, it is intended that the former shall be of such size as to handle small currents of such strength as cannot be effectively measured by the meter B.

The invention has been shown and described in connection with the three-wire system of distribution. It will be obvious, however, that the same is equally well adapted for use on the two-wire system.

Having now described my invention, what I claim as new, and desire to secure by Letters Patent, is—

1. The combination with a plurality of meters, of an automatic switch for coupling the same, the said switch comprising a lever, contacts carried thereby, and a solenoid for actuating the lever made up of coils of the positive and negative service-wires wound in opposite directions.

2. The combination with a plurality of meters, of an automatic switch for coupling the same, the said switch comprising a lever fulcrumed at a point intermediate its ends, contacts carried by said lever at one end, an adjustable weight on said lever at its opposite end, and a magnet for actuating said lever in opposition to said weight.

3. The combination with a plurality of meters of different capacities, installed in a three-wire system of electrical distribution, the small meter being in the service-circuit and the large meter in a normally-open branch therefrom, of a switch for closing said branch, the same comprising a lever, contacts carried thereby, an adjustable counterbalance-weight thereon, a solenoid made up of coils of the positive and negative service-wires wound in opposite directions, and a core for the solenoid connected to said lever, the said solenoid being adapted, upon the passage of a current of a greater strength than the capacity of the small meter, to actuate said lever in opposition to said weight and thereby close said branch circuit.

In testimony whereof I have hereunto set my hand in presence of two subscribing witnesses.

LYMAN C. REED.

Witnesses:
T. J. FORD,
HY MÜLLER.